US012427873B2

(12) United States Patent
Makino

(10) Patent No.: US 12,427,873 B2
(45) Date of Patent: Sep. 30, 2025

(54) DRIVING ASSISTANCE APPARATUS

(71) Applicant: SUBARU CORPORATION, Tokyo (JP)

(72) Inventor: Kazuki Makino, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 425 days.

(21) Appl. No.: 17/342,733

(22) Filed: Jun. 9, 2021

(65) Prior Publication Data
US 2021/0387535 A1 Dec. 16, 2021

(30) Foreign Application Priority Data

Jun. 10, 2020 (JP) ................. 2020-100778

(51) Int. Cl.
B60L 53/12 (2019.01)
B60L 53/30 (2019.01)
(Continued)

(52) U.S. Cl.
CPC .............. B60L 53/12 (2019.02); B60L 53/30 (2019.02); B60L 58/12 (2019.02); G01C 21/36 (2013.01)

(58) Field of Classification Search
CPC ......... B60L 5/005; B60L 50/53; B60L 53/00; B60L 53/12; B60L 53/30; B60L 58/12;
(Continued)

(56) References Cited

U.S. PATENT DOCUMENTS 11,813,947 B1* 11/2023 Pathipati ................. H02J 50/90
2010/0121509 A1* 5/2010 Takeshima .............. B60L 50/53
404/1
(Continued)

FOREIGN PATENT DOCUMENTS

JP 2013-73385 A 4/2013
JP 2014-48086 A 3/2014
(Continued)

OTHER PUBLICATIONS

Machine translation of JP-2019191200-A (Year: 2025).*
(Continued)

Primary Examiner — Aniss Chad
Assistant Examiner — Jennifer M Anda
(74) Attorney, Agent, or Firm — TROUTMAN PEPPER LOCKE LLP

(57) ABSTRACT

A driving assistance apparatus includes an information acquiring unit and a determining unit. The information acquiring unit is configured to acquire a target value of a power storage amount in an onboard battery mounted on a vehicle. The determining unit is configured to determine one or more charging implementation lanes out of charging lanes that are traveling lanes provided on a travel route of the vehicle to an expected arrival location, apart from each other along a direction of the travel route, and configured to charge the onboard battery while the vehicle is traveling. The one or more charging implementation lanes are part of the charging lanes to implement charging of the onboard battery. The determining unit is configured to determine, on the basis of the target value of the power storage amount, the one or more charging implementation lanes to minimize a number of times of the charging of the onboard battery.

11 Claims, 9 Drawing Sheets

(51) Int. Cl.
*B60L 58/12* (2019.01)
*G01C 21/36* (2006.01)

(58) Field of Classification Search
CPC ... B60W 40/06; G01C 21/3469; G01C 21/36; Y02T 10/70; Y02T 10/7072; Y02T 90/12; Y02T 90/14; Y02T 90/16
See application file for complete search history.

(56) References Cited

U.S. PATENT DOCUMENTS

| | | | |
|---|---|---|---|
| 2012/0290506 A1* | 11/2012 | Muramatsu | G01C 21/3679 701/400 |
| 2016/0138925 A1* | 5/2016 | Takahashi | B60L 53/665 701/533 |
| 2017/0136889 A1* | 5/2017 | Ricci | B60L 53/126 |
| 2018/0037136 A1* | 2/2018 | Nelson | G01C 21/00 |
| 2020/0072626 A1* | 3/2020 | Kumar | G01C 21/3676 |

FOREIGN PATENT DOCUMENTS

| | | | |
|---|---|---|---|
| JP | 2014-240757 A | | 12/2014 |
| JP | 2015-1466 A | | 1/2015 |
| JP | 2019-158379 A | | 9/2019 |
| JP | 2019-158413 A | | 9/2019 |
| JP | 2019191200 A | * | 10/2019 |

OTHER PUBLICATIONS

Notice of Reasons for Refusal issued in Japanese Patent Application No. 2020-100778 dated Jan. 9, 2024, with machine translation.

* cited by examiner

DRIVING ASSISTANCE APPARATUS

CROSS-REFERENCE TO RELATED APPLICATION

The present application claims priority from Japanese Patent Application No. 2020-100778 filed on Jun. 10, 2020, the entire contents of which are hereby incorporated by reference.

BACKGROUND

The technology relates to a driving assistance apparatus that assists driving of a vehicle by a driver.

Electric vehicles and hybrid electric vehicles have become widely used. An electric vehicle is able to travel without using fuel, such as gasoline. A hybrid electric vehicle is able to perform traveling using fuel and traveling using electricity in combination.

With the growing use of such vehicles, traveling lanes (charging lanes) have been set up that make it possible to charge a power storage device mounted on a vehicle while the vehicle is traveling.

For example, Japanese Unexamined Patent Application Publication No. 2013-073385 discloses a technique in which a power-receiving device installed in a vehicle receives induced electric power by the vehicle passing above a buried electromagnetic-induction power feeding device.

SUMMARY

An aspect of the technology provides a driving assistance apparatus including an information acquiring unit and a determining unit. The information acquiring unit is configured to acquire a target value of a power storage amount in an onboard battery mounted on a vehicle. The determining unit is configured to determine one or more charging implementation lanes out of charging lanes that are traveling lanes provided on a travel route of the vehicle to an expected arrival location, apart from each other along a direction of the travel route, and configured to charge the onboard battery while the vehicle is traveling. The one or more charging implementation lanes are part of the charging lanes and to implement charging of the onboard battery. The determining unit is configured to determine, on the basis of the target value of the power storage amount, the one or more charging implementation lanes to minimize a number of times of the charging of the onboard battery.

An aspect of the technology provides a driving assistance apparatus including circuitry. The circuitry is configured to acquire a target value of a power storage amount in an onboard battery mounted on a vehicle. The circuitry is configured to determine one or more charging implementation lanes out of charging lanes. The changing lanes are traveling lanes provided on a travel route of the vehicle to an expected arrival location, apart from each other along a direction of the travel route, and allowed to charge the onboard battery while the vehicle is traveling. The one or more charging implementation lanes are part of the charging lanes and to implement charging of the onboard battery. The circuitry is configured to determine, on a basis of the target value of the power storage amount, the one or more charging implementation lanes to minimize a number of times of the charging of the onboard battery.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
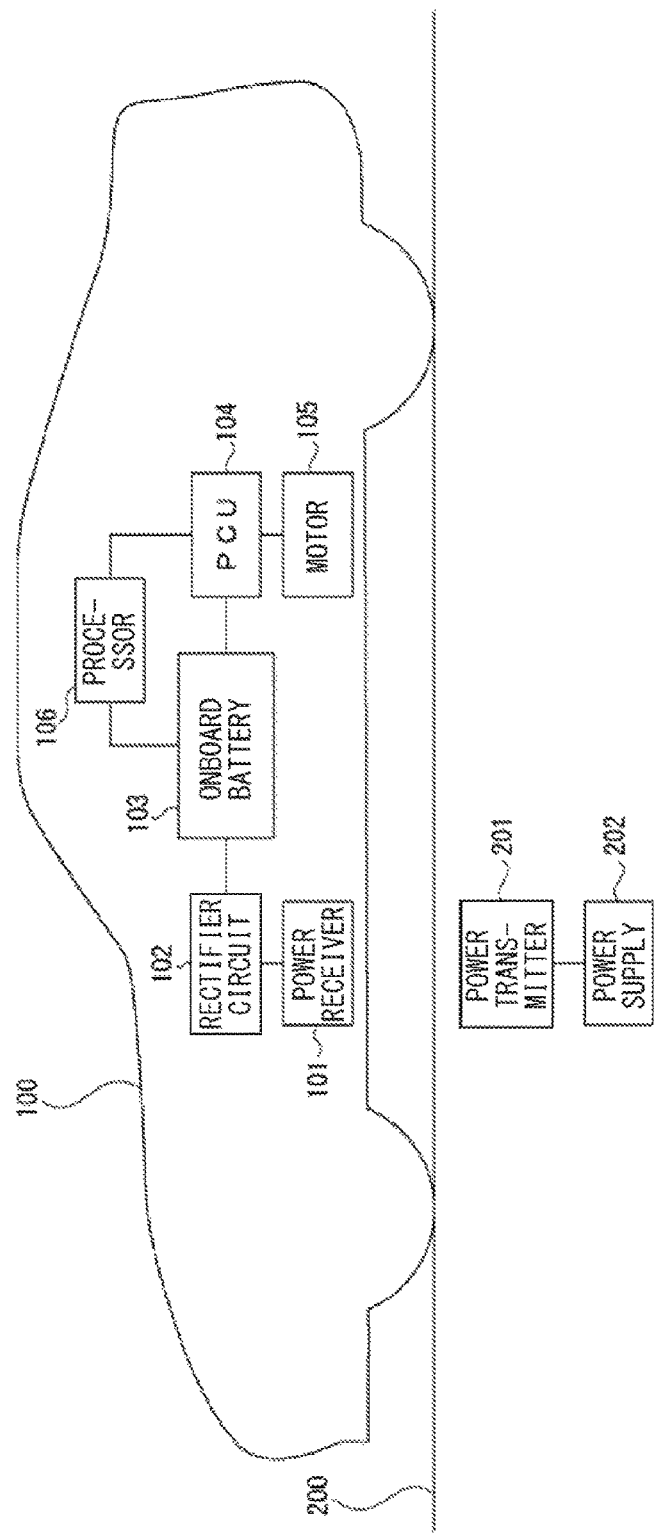
FIG. 1 is a schematic block diagram illustrating examples of a vehicle and a charging lane according to one example embodiment of the technology.

Charging lanes can become congested as electric vehicles and hybrid electric vehicles become widely used.

It is desirable to provide a driving assistance apparatus that makes it possible to promote efficient use of a charging lane.

In the following, a driving assistance apparatus 1 according to some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 illustrates an example configuration of a vehicle 100 and a charging lane 200 on which the vehicle 100 travels. The vehicle 100 may be an electric vehicle.

The charging lane 200 may include a power transmitter 201 and a power supply 202 that supplies electric power to the power transmitter 201.

The power transmitter 201 may include a power-transmitting coil, for example.

The power supply 202 may be a high-frequency alternating-current power supply. Alternating current may flow from the power supply 202 to the power transmitter 201 to generate a magnetic field in the power-transmitting coil.

The charging lane 200 may be provided, for example, as a part of a road. For example, the charging lane 200 may be provided intermittently on a road laid between location A and location B.

In a given section on a road, the charging lane 200 and a non-charging lane may be provided together. For example, only one lane may serve as the charging lane 200 on a road with two lanes on each side. In this case, whether to use the charging lane 200 may be selected.

The vehicle 100 may include a power receiver 101, a rectifier circuit 102, an onboard battery 103, a power control unit (PCU) 104, a motor 105, and a processor 106.

The power receiver 101 may include a power-receiving coil, for example. When the power receiver 101 passes above the power transmitter 201 buried in the charging lane 200, electromagnetic induction may occur to generate current in the power receiver 101.

An alternating-current input voltage based on the current generated in the power receiver 101 may be supplied to the rectifier circuit 102. The rectifier circuit 102 may serve as an alternating current (AC)/direct current (DC) converter circuit. The rectifier circuit 102 may convert the input voltage serving as an alternating-current voltage into a direct-current voltage, and supply the direct-current voltage to the onboard battery 103.

The onboard battery 103 may be a high-voltage battery. The onboard battery 103 may supply electric power to be used to drive wheels and electric power to be used to drive various electronic apparatuses of the vehicle 100. FIG. 1 illustrates supply of the electric power to be used to drive the wheels from the onboard battery 103, and omits supply of electric power to be used to drive other units.

The onboard battery 103 may be charged on the basis of the direct-current voltage supplied from the rectifier circuit 102.

Thus, the power transmitter 201 of the charging lane 200, and the power receiver 101 and the rectifier circuit 102 of the vehicle 100 enable wireless charging of the onboard battery 103.

The onboard battery 103 may supply, to the PCU 104, a power supply voltage to be used to drive the motor 105.

The PCU 104 may include an inverter and a DC/DC converter, for example, to be used to drive the motor 105.

The PCU 104 may generate alternating current to be used to drive the motor 105, on the basis of the above power supply voltage, and supply the alternating current to the motor 105. The PCU 104 may perform torque control of the motor 105 by controlling the alternating current. The PCU 104 may also be configured to perform regenerative braking to thereby optimize energy efficiency by using regenerative energy.

The motor 105 may serve as a motor generator configured to generate electric power. The motor 105 may drive the wheels on the basis of the supplied alternating current.

The processor 106 may include a central processing unit (CPU) and a memory, for example. The processor 106 may comprehensively control the vehicle 100. The processor 106 may be provided as a single unit, or may include a plurality of electronic control units (ECUs). Examples of the plurality of ECUs may include various ECUs, such as a battery control ECU, a display control ECU, an airbag control ECU, and an air conditioning control ECU. The battery control ECU may perform charging control of the onboard battery 103. The display control ECU may perform display control for a display device included in the vehicle 100. Examples of the display device may also include a meter.

Although not illustrated in FIG. 1, the onboard battery 103 may be configured to be charged via a connector provided in the vehicle 100.

The processor 106 according to the example embodiment may, for example, use a measured value, such as an output current or an output voltage, of the onboard battery 103 to calculate and manage a state of charge (SOC) of the onboard battery 103. In another example, the PCU 104 may manage SOC information, and the processor 106 may be configured to acquire the SOC from the PCU 104.

The processor 106 may be configured to perform control corresponding to the SOC.

An example configuration of the processor 106 included in the vehicle 100 is described with reference to FIG. 2. The configuration of the processor 106 may also be referred to as a configuration included in the driving assistance apparatus 1. In other words, the driving assistance apparatus 1 may be configured to provide various types of assistance for driving of the vehicle 100 by including various units configured by the processor 106.

The processor 106 may include an information acquiring unit 10, a charging implementation distance calculator 11, a determining unit 12, and a route searching unit 13.

The information acquiring unit 10 may perform a process of acquiring information to be used for control of units of the vehicle 100. For example, the information acquiring unit 10 may acquire information on an accelerator position corresponding to a driver's operation on an accelerator pedal. On the basis of the acquired information on the accelerator position, the processor 106 may output, to the PCU 104, a target value of a control value (e.g., a current value) for the motor 105. The PCU 104 may control the motor 105 on the basis of the received target value of the control value. Execution of these series of processes causes a speed of the vehicle 100 to change in response to the driver's operation on the accelerator pedal.

In the example embodiment, the information acquiring unit 10 acquires information related to the onboard battery 103.

The information related to the onboard battery 103 may be, for example, information related to a power storage amount of the onboard battery 103. The information related to the onboard battery 103 may be the SOC information. The SOC information may be updated to latest information on a regular basis.

Alternatively, the information related to the onboard battery 103 may be information to be inputted by a user (e.g., the driver or a passenger).

For example, in a case where the current power storage amount is 30% short of a power storage amount (0 to 100%) necessary to move to a destination by the vehicle 100, the user may desire to add a power storage amount corresponding to the 30% shortage on the charging lane 200 provided on his/her way. The power storage amount of 30% inputted by the user may be regarded as the information related to the onboard battery 103. In the following description, the designated power storage amount expected to be added may be referred to as an "expected increase in power storage amount".

In another example, the information related to the onboard battery 103 may be information on a desired power storage level to be inputted by the user. For example, assume that the user desires to fully charge the onboard battery 103 somewhere on his/her way of moving to the destination by the vehicle 100, and designates full-charge (a power storage rate 100%) as the desired power storage level. The designated desired power storage level may be regarded as the information related to the onboard battery 103. In the following description, the desired power storage level may be referred to as a "target power storage level". The power storage rate 100% may be referred to as a power storage level 100%.

In the following description, in a case of referring to a target for the power storage amount without distinguishing between the "expected increase in power storage amount" and the "target power storage level", they may be referred to as a "target value of the power storage amount".

The information acquiring unit 10 acquires the above-described information related to the onboard battery 103. Such information may be automatically acquired regardless of the user's operation, or may be acquired via a user interface (UI) presented to the user on a display of the vehicle 100. In another example, the information related to the onboard battery 103 may be inputted by the user with the use of a dedicated program (application) installed on a mobile terminal, such as a smartphone, and may be acquired via a network, or via a communication cable or wireless communication, for example. The information related to the onboard battery 103 may be the expected increase in power storage amount or the target power storage level.

Examples of the acquisition via a network may also include a case where the user uploads information on the expected increase in power storage amount to a server with the use of a smartphone, and the information acquiring unit 10 acquires the information by downloading it from the server.

In this manner, the information acquiring unit 10 may acquire the information related to the onboard battery 103 as information for determination of the charging lane 200 to be used.

In place of the expected increase in power storage amount, a toll may be designated by the user. The toll may be a usage fee for the charging lane 200, and may be collected on the basis of a charging implementation distance or an increase in power storage amount. In this case, the designated usage fee may be used as the information related to the onboard battery 103, or the expected increase in power storage amount calculated from the designated usage fee may be used as the information related to the onboard battery 103.

The information acquiring unit 10 may also acquire electricity consumption information of the vehicle 100. The electricity consumption information may be calculated on the basis of a travel distance and the power storage amount consumed of the onboard battery 103, and may be stored in a storage unit, such as a memory. The electricity consumption information may be updated, for example, for each predetermined travel distance.

The charging implementation distance calculator 11 may calculate the charging implementation distance for each of charging lanes 200 provided on a route from a first location to a second location, on the basis of the information related to the onboard battery 103 acquired by the information acquiring unit 10.

The first location may refer to a departure location, for example, the current location. In a case of moving to the destination after fully charging the onboard battery 103 at a predetermined charging station, for example, the charging station may serve as the first location.

The second location may refer to the destination, for example, a place where the driver desires to arrive finally. In another example, the nearest charging station from the place where the driver desires to arrive finally may serve as the second location. In one embodiment, the second location may serve as an "expected arrival location".

As described above, the charging implementation distance calculator 11 may calculate, for each of the charging lanes 200 travelable when moving from the first location to the second location, the charging implementation distance for attainment of the target value of the power storage amount ("expected increase in power storage amount" or "target power storage level").

For example, in a case where the information related to the onboard battery 103 acquired by the information acquiring unit 10 is the "expected increase in power storage amount", and the expected increase in power storage amount is 30%, the vehicle 100 may travel on any of the travelable charging lanes 200 such that the increase in power storage amount becomes 30%. In this case, the charging implementation distance calculator 11 may calculate the charging implementation distance on the charging lane 200 to keep the use of the charging lane 200 to a minimum.

The charging implementation distance calculator 11 may calculate, on the basis of the relationship between a distance traveled on the charging lane 200 and the increased power storage amount, the charging implementation distance on the charging lane 200 from the expected increase in power storage amount (30%).

For example, in a case where the power storage amount increases by X % each time the vehicle 100 travels 100 meters on the charging lane 200, the charging implementation distance may be obtained by dividing the expected increase in power storage amount of 30% by X % and multiplying the result by 100 meters.

This makes it possible to, instead of traveling the whole distance of a given charging lane 200, travel only a part of the distance, which helps to relieve congestion on the charging lane 200.

In a case where the information related to the onboard battery 103 acquired by the information acquiring unit 10 is the "target power storage level", and the target power storage level is 100%, the charging implementation distance calculator 11 may calculate the charging implementation distance on the charging lane 200 such that the power storage amount becomes "100%" at any timing while the vehicle 100 is traveling.

Figure 3:
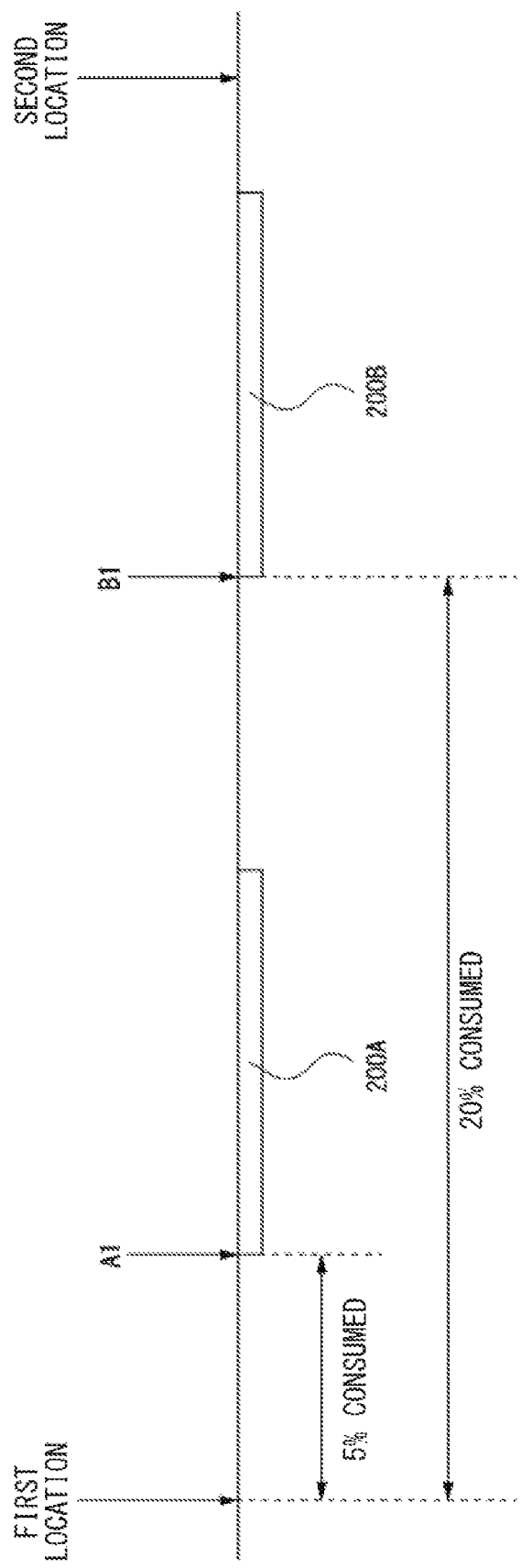
FIG. 3 is a diagram illustrating an example in which two charging lanes are laid between a first location and a second location.

FIG. 3 illustrates an example.

Assume that two charging lanes 200A and 200B are laid between the first location and the second location. Also assume that the power storage amount consumed before the vehicle 100 reaches a starting point A1 of the charging lane 200A close to the first location is 5%, and that the power storage amount consumed before the vehicle 100 reaches a starting point B1 of the charging lane 200B close to the second location is 20%.

To attain the target power storage level by using the charging lane 200A, a power storage amount corresponding to (the target power storage level 100%−the current power storage amount)+5% has to be added by traveling on the charging lane 200A. The charging implementation distance calculator 11 may calculate a travel distance for the charging lane 200A necessary to attain this amount to be added.

To attain the target power storage level by using the charging lane 200B, a power storage amount corresponding to (the target power storage level 100%−the current power storage amount)+20% has to be added by traveling on the charging lane 200B. The charging implementation distance calculator 11 may calculate a travel distance for the charging lane 200B necessary to attain this amount to be added.

The charging lane 200A and the charging lane 200B may differ from each other in the increase in power storage amount with respect to the travel distance. In other words, charging efficiency may differ between the charging lane 200A and the charging lane 200B. For example, the charging implementation distance calculator 11 may obtain the respective charging implementation distances on the charging lane 200A and the charging lane 200B in consideration of the charging efficiency for each of the charging lanes 200.

Note that, in a case where the starting point of the charging lane 200A is far, a case where the current power storage amount is small, or a case where a distance of the charging lane 200 is short, for example, it may not be possible to attain the target power storage level even by using the whole section from a starting point to an endpoint of the charging lane 200. In that case, the increased power storage amount in a case of using the whole section, in place of the charging implementation distance, may be calculated to be managed.

The determining unit 12 may perform a process of determining the charging lane 200 to be used out of the charging lanes 200 provided on the route from the first location to the second location, on the basis of the information related to the onboard battery 103 acquired by the information acquiring unit 10 and the charging implementation distance for each of the charging lanes 200 calculated by the charging implementation distance calculator 11.

In the process of determining the charging lane 200, the determining unit 12 minimizes the number of the charging lanes 200 to be used. The determining unit 12 may count a number of times of charging of the onboard battery 103 so that the number of times of the charging of the onboard battery 103 may be incremented by one, at each of when the vehicle 100 is to enter into each of the charging lanes 200 to be used.

For example, assume that three charging lanes 200A, 200B, and 200C are provided between the first location and the second location. Assume that, to attain the target value of the power storage amount, the charging lane 200A and the charging lane 200B (or the charging lane 200C) have to be used in a case of using the charging lane 200A, that only the charging lane 200B has to be used in a case of using the charging lane 200B, and that the charging lane 200C and the charging lane 200B (or the charging lane 200A) have to be used in a case of using the charging lane 200C.

In this case, the determining unit 12 may determine that the charging lane 200B is to be used such that the charging lane 200 is used only once.

Thus, the determining unit 12 determines the charging lane 200 to be used to reduce the number of times the charging lane 200 is used, which makes it possible to satisfy the user's request while avoiding congestion on the charging lane 200.

In a case where the power storage amount reaches a predetermined value while the charging lane 200 is being used, the determining unit 12 may determine that a lane change is to be made to a non-charging lane from the charging lane 200 on which the vehicle 100 is traveling. In other words, the determining unit 12 may determine that further use of the charging lane 200 is unnecessary.

The predetermined value of the power storage amount may refer to a value set as the target value of the power storage amount, such as the "expected increase in power storage amount" or the "target power storage level". The increase in power storage amount resulting from traveling on the charging lane 200 may be larger than expected. In such a case, it may be determined that a lane change is to be made from the charging lane 200 even if a distance used is shorter than the expected charging implementation distance.

The route searching unit 13 may search for routes from the first location to the second location. The route searching unit 13 may present, out of the found plurality of routes, a predetermined number of (e.g., five) routes as a search result to the user on the basis of an arrival time or a travel distance. The user may select one route from the presented plurality of routes.

The calculation process by the charging implementation distance calculator 11 and the determination process by the determining unit 12 may be performed for the predetermined number of routes presented by the route searching unit 13. In this case, the calculation process and the determination process may be performed for each of the predetermined number of (e.g., five) routes to be presented to the user.

In another example, the calculation process by the charging implementation distance calculator 11 and the determination process by the determining unit 12 may be performed for the route selected by the user from among the predetermined number of routes presented to the user. In this case, the calculation process and the determination process may be performed for one route selected by the user.

Examples of a screen serving as a user interface to be presented to the user (e.g., the driver or a passenger) are described with reference to FIG. 4, FIG. 5, and FIG. 6.

The screen examples illustrated in the drawings are assumed to be presented in a case where one route is selected from the predetermined number of routes presented as the search result of the route searching unit 13.

Each screen may be displayed on the display included in the vehicle 100, or may be displayed on a display included in an information processing device, such as a mobile terminal, used by the user. In a case of displaying the screen on the display included in the vehicle 100, the processor 106 may perform user interface processing, such as display processing.

Figure 4:
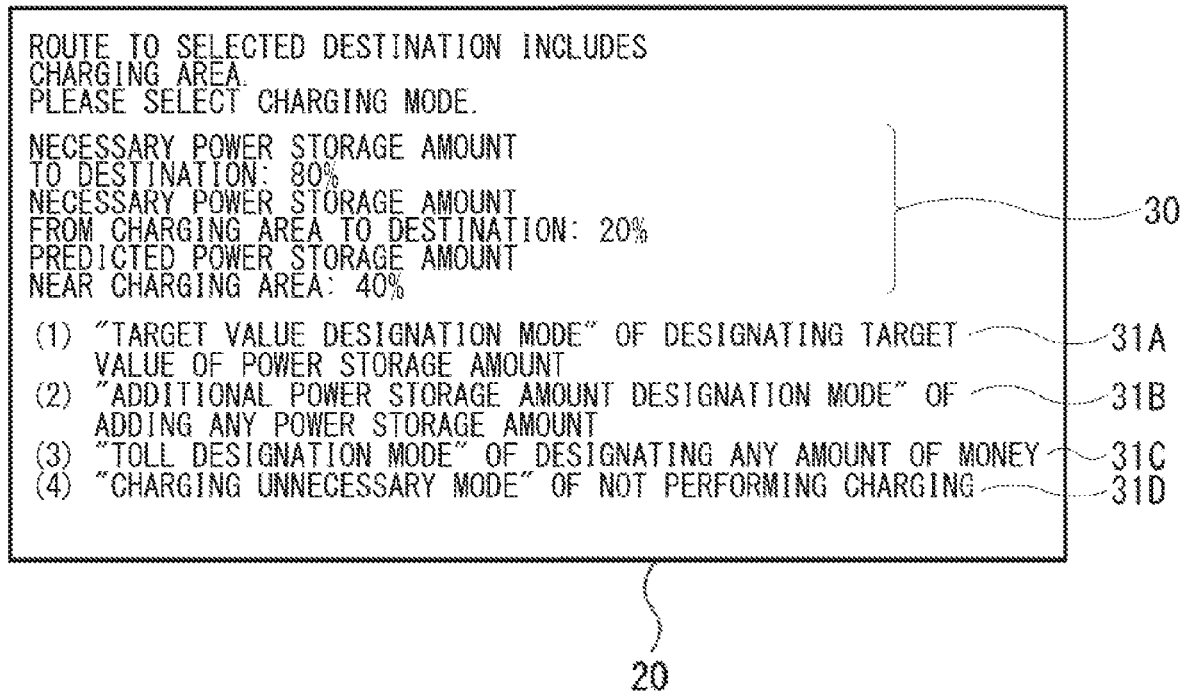
FIG. 4 is a diagram illustrating an example of a mode designation screen.

FIG. 4 illustrates a screen to be displayed in a case where the user selects one route from the plurality of routes presented to the user, e.g., a mode designation screen 20.

On the mode designation screen 20, together with instructions prompting selection of a mode, presentation information 30 may be presented as various types of information serving as an aid for the selection by the user.

The presentation information 30 may include information other than the information illustrated in FIG. 4. Examples may include information on the current power storage amount.

Options of the selectable modes may be displayed below the presentation information 30.

The first option may be a target value designation mode option 31A for designation of the target power storage level. Selecting this mode makes it possible to designate the "target power storage level".

The second option may be an additional power storage amount designation mode option 31B for addition of any power storage amount. Selecting this mode makes it possible to designate the "expected increase in power storage amount".

The third option may be a toll designation mode option 31C for designation of an amount of money to be used for addition of the power storage amount. Selecting this mode makes it possible to designate the usage fee for the charging lane 200.

The fourth option may be a charging unnecessary mode option 31D for no charging.

Figure 5:
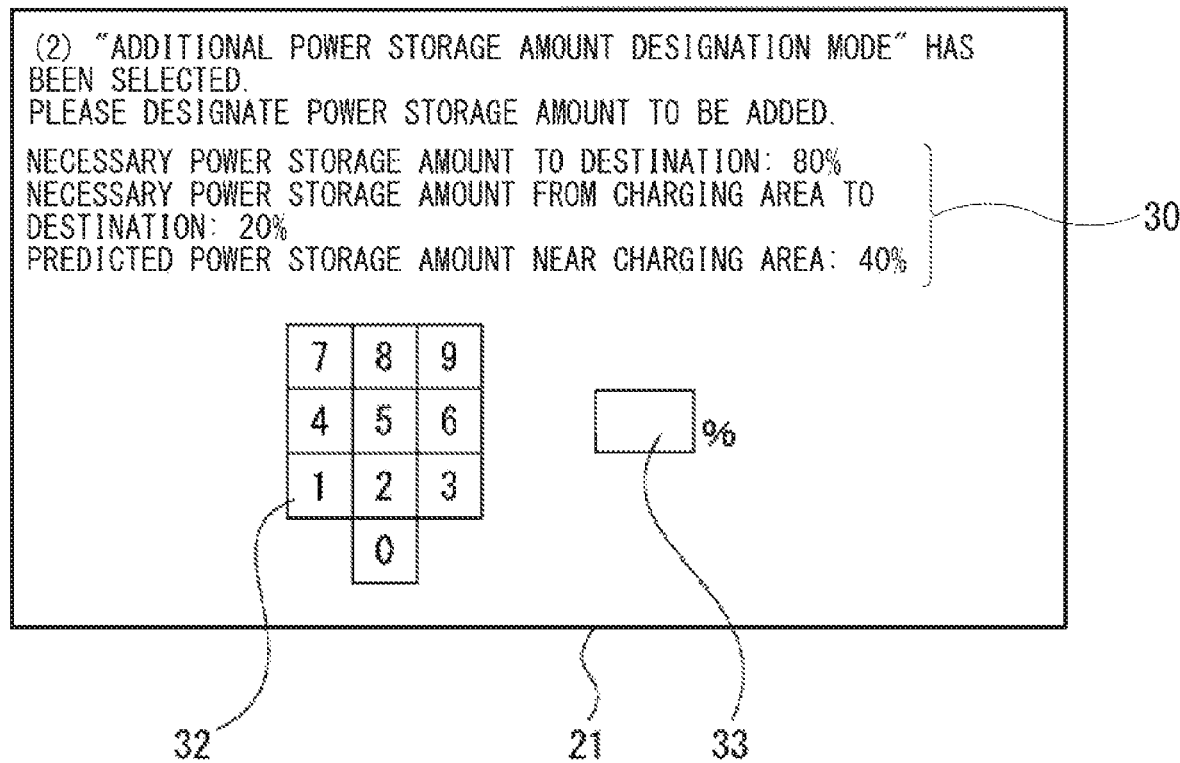
FIG. 5 is a diagram illustrating an example of an additional power storage amount designation screen.

FIG. 5 illustrates an example of an additional power storage amount designation screen 21 to be displayed in a case where the second option, i.e., the additional power storage amount designation mode option 31B, is selected.

On the additional power storage amount designation screen 21, the presentation information 30 may be displayed together with instructions prompting designation of the power storage amount. Below the presentation information 30 may be displayed a numeric key operation device 32 serving as an input operation device and an additional power storage amount input box 33.

Operating the numeric key operation device 32 enables the user to input a desired value to the additional power storage amount input box 33.

Also in a case where the first option, i.e., the target value designation mode option 31A, is selected, a screen similar to that illustrated in FIG. 5 may be displayed. For example, a screen with the numeric key operation device 32 serving as an input operation device and a target value input box may be displayed.

Figure 6:
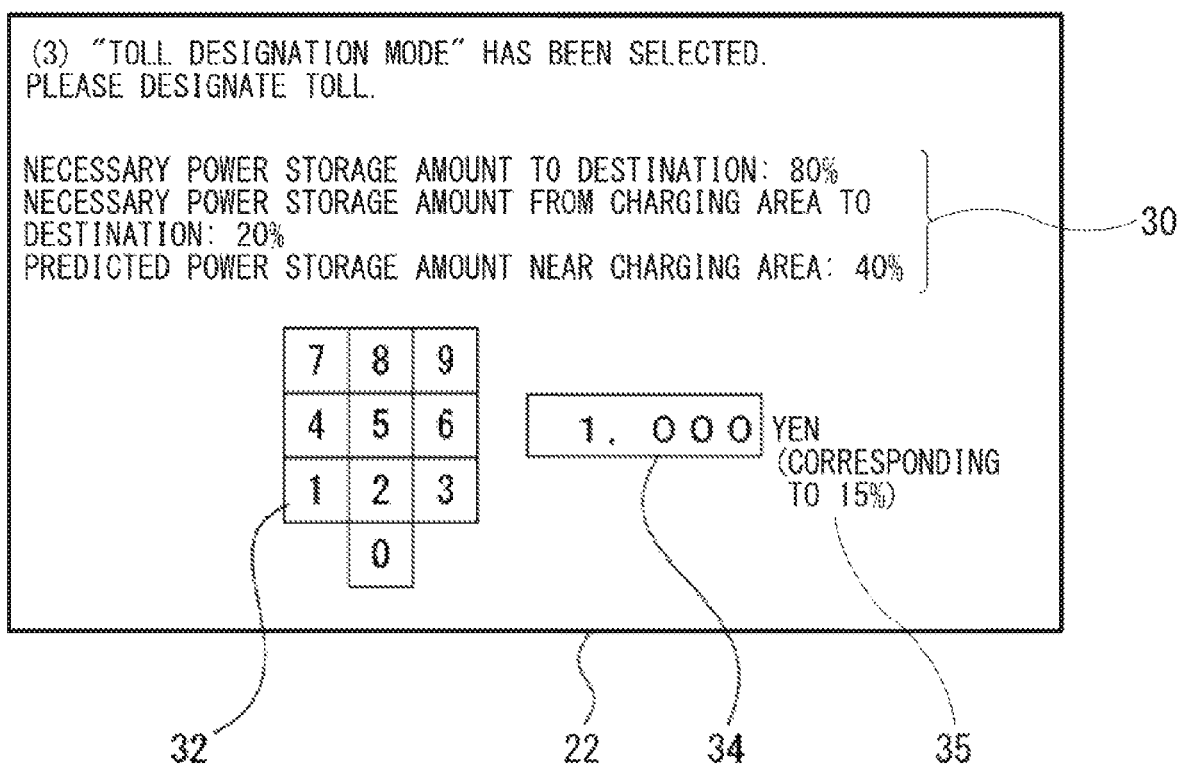
FIG. 6 is a diagram illustrating an example of a toll designation screen.

FIG. 6 illustrates an example of a toll designation screen 22 to be displayed in a case where the third option, i.e., the toll designation mode option 31C, is selected.

On the toll designation screen 22, the presentation information 30 may be displayed together with instructions prompting designation of the toll to be paid for the use of the charging lane 200. Below the presentation information 30 may be displayed the numeric key operation device 32 serving as an input operation device and a toll input box 34.

Operating the numeric key operation device 32 enables the user to input a desired value to the toll input box 34.

When the user inputs the toll, the processor 106 may calculate a rough estimate of the power storage amount addable with the designated toll. The calculated rough estimate of the increase in power storage amount may be presented to the user as a rough estimate indication 35.

The user may designate the toll again while checking the rough estimate indication 35. This makes it possible to prevent a power storage amount unintended by the user from being designated, which helps to avoid a state in which the vehicle 100 is unable to travel due to shortage of the power storage amount.

[4. Flowcharts]

Figure 7:
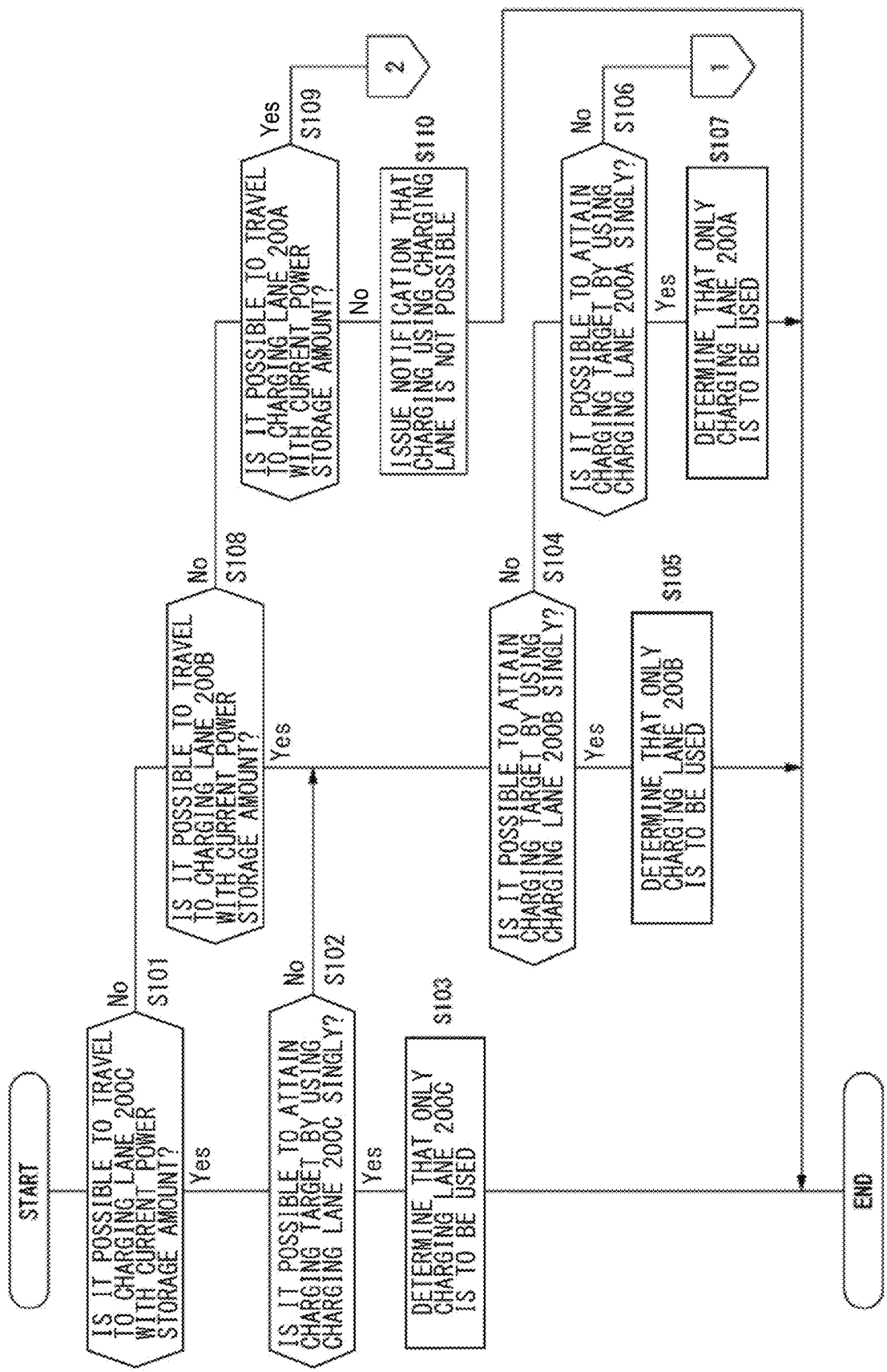
FIG. 7 is an example of a flowchart to be executed by the processor.
Figure 8:
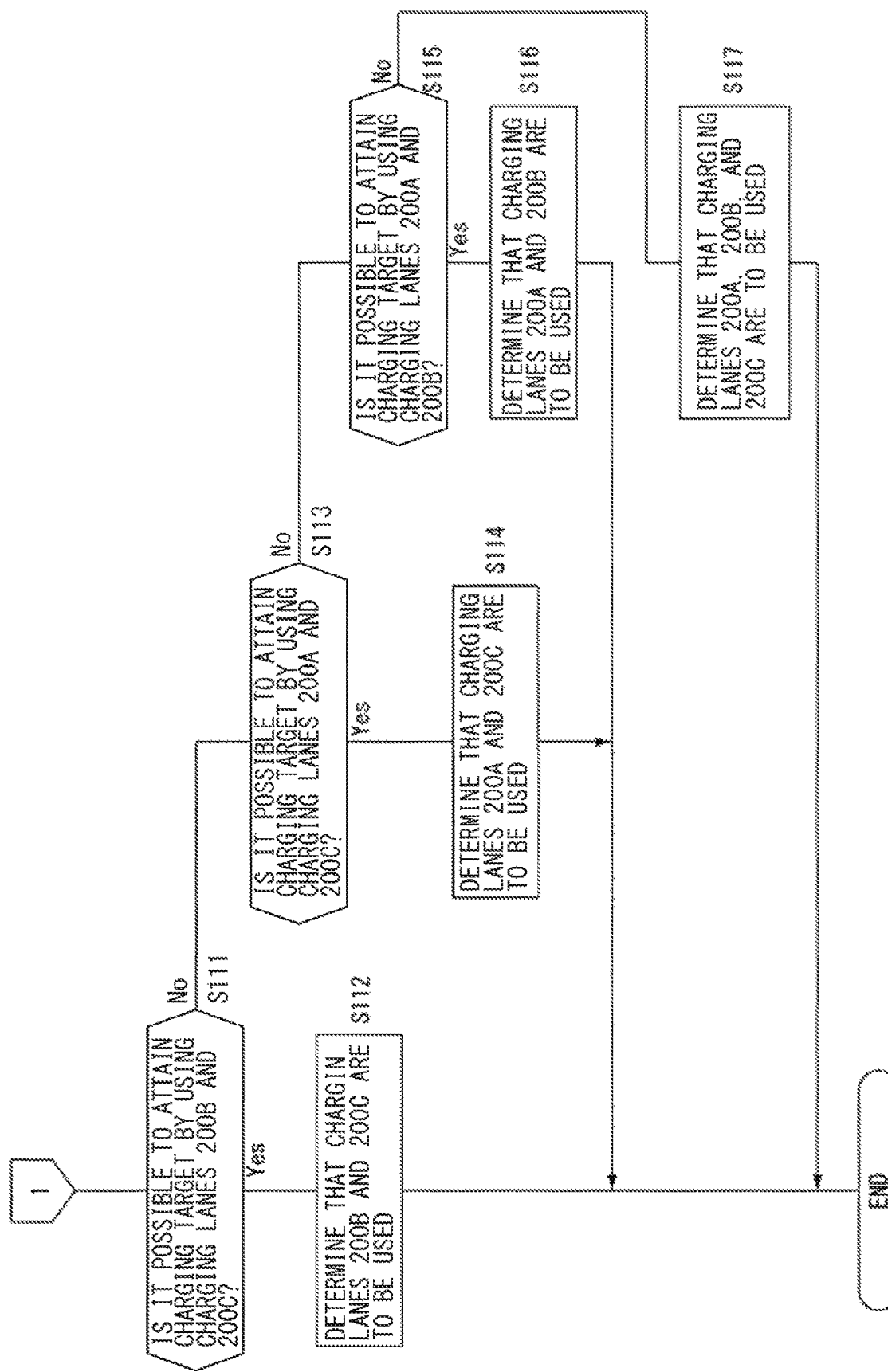
FIG. 8 is an example of a flowchart to be executed by the processor.
Figure 9:
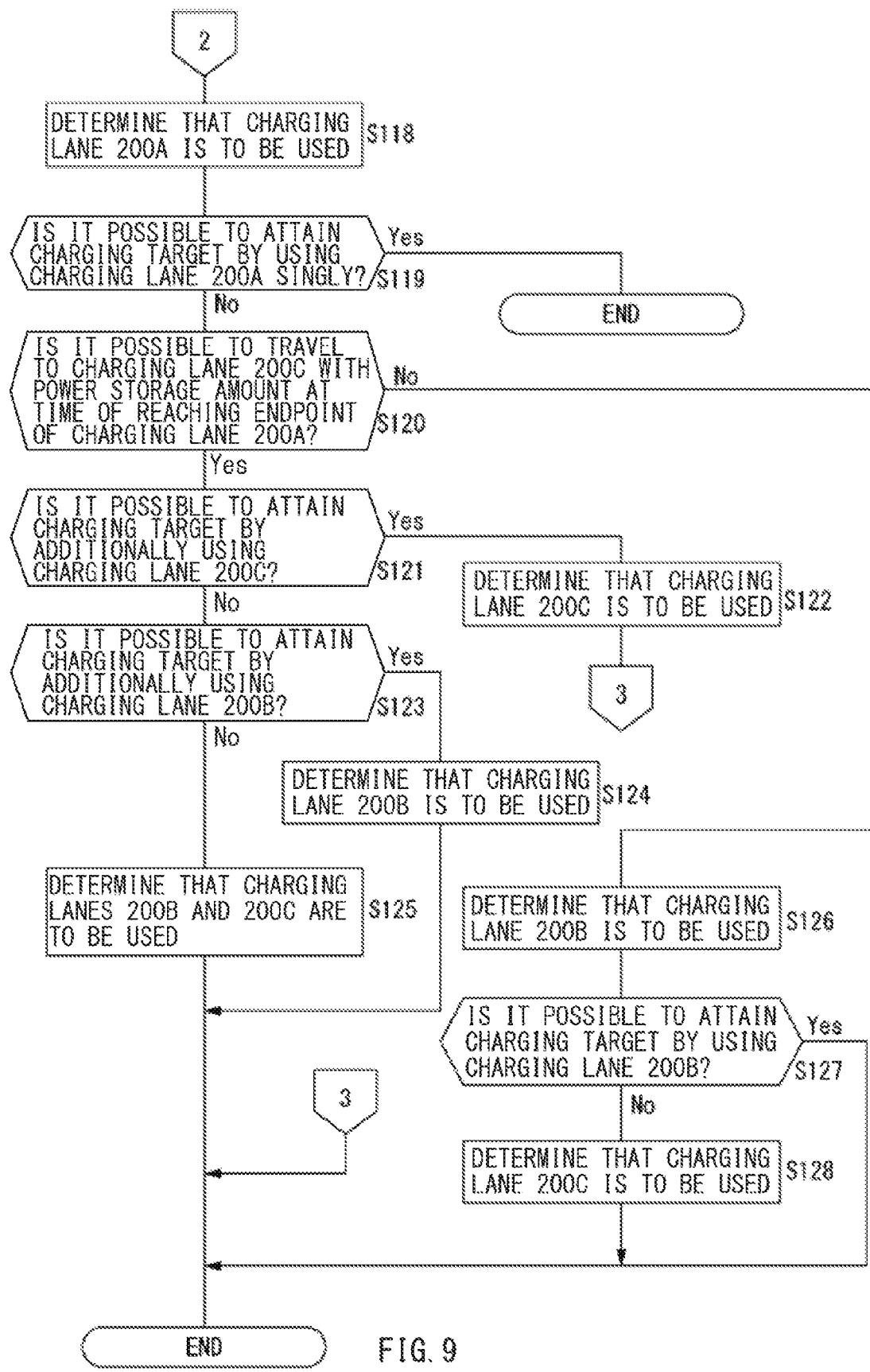
FIG. 9 is an example of a flowchart to be executed by the processor.

FIG. 7, FIG. 8, and FIG. 9 illustrate examples of flowcharts to be executed by the processor 106 to implement the various processes described above. The process examples illustrated in the flowcharts represent examples in a case where the three charging lanes 200A, 200B, and 200C are laid between the first location and the second location (see FIG. 10). Of the three charging lanes 200A, 200B, and 200C, the charging lane 200A may be the closest to the first location, and the charging lane 200C may be the farthest from the first location.

Before executing a process of step S101 illustrated in FIG. 7, the processor 106 may acquire, for each of the charging lanes 200, information on the length of the charging lane 200 and the power storage amount to be increased by using the charging lane 200, for example. Processes to be described later may be executed by the processor 106 on the basis of such information.

The processor 106 may, in step S101, determine whether it is possible to travel to a starting point C1 of the charging lane 200C with the current power storage amount of the onboard battery 103. One reason for this is that, in a case where it is not possible to travel to the charging lane 200C, the onboard battery 103 has to be charged before reaching the charging lane 200C.

This determination may be made on the basis of an average or a worst value of the travel distance per power storage amount obtained from the most recent traveling history of the vehicle 100.

Upon determining that it is possible to travel to the charging lane 200C (Yes in step S101), the processor 106 may, in step S102, determine whether it is possible to attain the target value of the power storage amount ("expected increase in power storage amount" or "target power storage level") by using only the charging lane 200C. The target value of the power storage amount may be simply referred to as a "charging target" in the following description.

Upon determining that the charging target is attainable by using only the charging lane 200C (Yes in step S102), the processor 106 may, in step S103, determine that only the charging lane 200C is to be used, and bring the series of processes to an end.

For example, the processor 106 may perform vehicle control or notification to cause (or prompt) the vehicle 100 to travel to the charging lane 200C without using the charging lane 200, and make a lane change, for example, to use the charging lane 200C at a point in time of reaching the starting point C1 of the charging lane 200C, to thereby attain the charging target by the use of the charging lane 200C. The vehicle control may refer to, in a case where the vehicle 100 is a vehicle configured to be automatically driven, performing lane change control, for example, on the vehicle 100 to cause the vehicle 100 to travel on a predetermined lane.

Note that, after step S103, the processor 106 may determine whether it is possible to attain the charging target by using only a part of the charging lane 200C. Upon determining that the charging target is attainable by using only a part of the charging lane 200C, the processor 106 may perform a process of determining which portion is to be used, from the starting point C1 to an endpoint C2 of the charging lane 200C.

In one example, the processor 106 may execute a process of determining a travel starting location, a travel ending location, or both on the charging lane 200C.

Performing such a process makes it possible to perform control of refraining from using a part of the charging lane 200C, which helps to suppress unnecessary use of the charging lane 200, and to relieve congestion on the charging lane 200. Keeping the use of the charging lane 200 to a minimum makes it possible to delay deterioration of the charging lane 200.

Such a process may also be performed after processes of steps S105, S107, S112, S114, S116, S117, "Yes" determination in S119, S122, S124, S125, "Yes" determination in S127, and S128. These processes will be described later.

In a case of determining the travel starting location, the travel ending location, or both on the charging lane 200, it may be determined to make the portion to be used as close as possible to the second location. For example, only the travel starting location may be determined, and the travel ending location may be set to be the endpoint of the charging lane 200. This makes it likely for the power storage amount to be largest at the second location. A reason for this will be described later.

Note that, although the series of processes illustrated in FIG. 7, FIG. 8, and FIG. 9 are assumed to be performed before using the charging lane 200C, the determination process as to whether to use the whole or a part of the charging lane 200C, for example, to be performed after step S103 may be performed while the vehicle 100 is traveling on the charging lane 200C.

For example, upon determining that the target has been attained while the vehicle 100 is traveling on the charging lane 200C, the processor 106 may perform control to leave the charging lane 200C. In another example, the processor 106 may calculate the increase in power storage amount after traveling a predetermined distance on the charging lane 200C, and calculate the charging implementation distance on the charging lane 200C from the calculation result, to calculate a location where the vehicle 100 is expected to leave the charging lane 200C.

Putting off the execution of these processes until the actual use of the charging lane 200C makes it possible to appropriately address the following example situations, as compared with a case of performing the processes in advance before traveling: a situation where unexpected consumption of the power storage amount occurs, because, for example, the user takes the wrong way on his/her way, and a situation where a traveling state is favorable and the power storage amount is not consumed as expected. It is also possible to prevent the processes from going to waste.

In the determination process as to whether it is possible to attain the charging target by using the charging lane 200C singly in step S102, upon determining that the charging target is unattainable (No in step S102), the processor 106 may cause the process to proceed to a determination process in step S104.

In step S104, the processor 106 may determine whether it is possible to attain the charging target by using only the charging lane 200B.

Upon determining that the charging target is attainable by using only the charging lane 200B (Yes in step S104), the processor 106 may, in step S105, determine that only the charging lane 200B is to be used, and bring the series of processes to an end.

Thus, the processor 106 may determine the non-use of the charging lane 200A, the use of the charging lane 200B, and the non-use of the charging lane 200C.

In the determination process as to whether it is possible to attain the charging target by using the charging lane 200B singly in step S104, upon determining that the charging target is unattainable (No in step S104), the processor 106 may cause the process to proceed to a determination process in step S106.

In step S106, the processor 106 may determine whether it is possible to attain the charging target by using only the charging lane 200A.

Upon determining that the charging target is attainable by using only the charging lane 200A (Yes in step S106), the processor 106 may, in step S107, determine that only the charging lane 200A is to be used, and bring the series of processes to an end.

Thus, the processor 106 may determine the use of the charging lane 200A and the non-use of the charging lane 200B and the charging lane 200C.

Determining that the charging target is unattainable by using only the charging lane 200A (No in step S106) corresponds to determining that using any of the charging lanes 200A, 200B, and 200C singly is insufficient. In this case, to use two or more of the charging lanes 200, the processor 106 may cause the process to proceed to a process illustrated in FIG. 8 to be described later.

Upon determining that it is not possible to travel to the starting point C1 of the charging lane 200C with the current power storage amount of the onboard battery 103 in step S101 (No in step S101), the processor 106 may determine whether it is possible to travel to either of the charging lanes 200A and 200B.

In this case, the processor 106 may, in step S108, determine whether it is possible to travel to the starting point B1 of the charging lane 200B with the current power storage amount of the onboard battery 103. If it is not possible to travel to the charging lane 200B, the processor 106 may determine whether it is possible to travel to the charging lane 200A.

Upon determining that it is possible to travel to the charging lane 200B in step S108 (Yes in step S108), the processor 106 may cause the process to proceed to step S104, and determine whether it is possible to attain the charging target by using the charging lane 200B singly.

Upon determining that it is not possible to travel to the starting point B1 of the charging lane 200B with the current power storage amount of the onboard battery 103 in step S108 (No in step S108), the processor 106 may, in step S109, determine whether it is possible to travel to the starting point A1 of the charging lane 200A with the current power storage amount of the onboard battery 103.

Determining that it is not possible to travel to the charging lane 200A (No in step S109) corresponds to determining that it is not possible to reach the first charging lane 200A unless the onboard battery 103 is charged.

In this case, the processor 106 may, in step S110, perform a process of issuing notification that charging using the charging lane 200 is not possible in this situation. This notification process may be performed by transmitting information to a terminal device used by the user, by performing display processing on the display included in the vehicle 100, or by performing both the transmission of information and the display processing.

Upon determining that it is possible to travel to the charging lane 200A (Yes in step S109), the processor 106 may cause the process to proceed to a process of step S118 illustrated in FIG. 9.

First, in step S118, the processor 106 may determine that the charging lane 200A is to be used. Thereafter, the processor 106 may, in step S119, determine whether it is possible to attain the charging target by using only the charging lane 200A.

Upon determining that the charging target is attainable by using only the charging lane 200A (Yes in step S119), the processor 106 may bring the series of processes to an end.

If it is determined that the charging target is unattainable by using only the charging lane 200A (No in step S119), either of the charging lanes 200B and 200C has to be used in addition to the charging lane 200A. Hence, processes for determining whether to use each of the charging lanes 200B and 200C may be performed in step S120 and subsequent steps.

First, the processor 106 may determine, in step S120, whether it is possible to travel to the starting point C1 of the charging lane 200C with the power storage amount after the use of the charging lane 200A, i.e., a predicted power storage amount of the onboard battery 103 at a point in time of reaching an endpoint A2. If it is not possible to travel to the charging lane 200C, the charging lane 200B has to be additionally used.

Upon determining that it is possible to travel to the starting point C1 of the charging lane 200C from the endpoint A2 of the charging lane 200A (Yes in step S120), the processor 106 may, in step S121, determine whether it is possible to attain the charging target by additionally using the charging lane 200C.

Upon determining that the charging target is attainable by using the charging lane 200C (Yes in step S121), the processor 106 may, in step S122, determine that the charging lane 200C is to be used, and bring the series of processes to an end.

Thus, the processor 106 may determine the use of the charging lane 200A, the non-use of the charging lane 200B, and the use of the charging lane 200C.

Upon determining that the charging target is unattainable by using the charging lane 200C in step S121 (No in step S121), the processor 106 may, in step S123, determine whether it is possible to attain the charging target by using the charging lane 200B. In other words, the processor 106 may determine whether it is possible to attain the target by using the two charging lanes 200A and 200B.

Upon determining that the target is attainable (Yes in step S123), the processor 106 may, in step S124, determine that the charging lane 200B is to be used and bring the series of processes to an end.

Thus, the processor 106 may determine the use of the charging lane 200A and the charging lane 200B and the non-use of the charging lane 200C.

Upon determining that the target is unattainable by using the charging lane 200B in step S123 (No in step S123), i.e., upon determining that it is not possible to travel to the starting point B1 of the charging lane 200B in the first place by the use of two charging lanes of the charging lanes 200B and 200C, and that the charging target is unattainable by the use of two charging lanes of the charging lanes 200A and 200B and the use of two charging lanes of the charging lanes 200A and 200C, the processor 106 may, in step S125, determine that the charging lanes 200B and 200C are to be used and bring the series of processes to an end.

Thus, the processor 106 may determine the use of all of the charging lanes 200A, 200B, and 200C.

Described above is the process performed in a case where it is determined in step S120 that it is possible to travel to the starting point C1 of the charging lane 200C with the predicted power storage amount of the onboard battery 103 at the point in time of reaching the endpoint A2.

Described next is a process performed in a case where it is determined in step S120 that it is not possible to travel to the starting point C1 of the charging lane 200C with the predicted power storage amount of the onboard battery 103 at the point in time of reaching the endpoint A2.

In a case where it is not possible to travel to the starting point C1 of the charging lane 200C with the predicted power storage amount of the onboard battery 103 at the point in time of reaching the endpoint A2 (No in step S120), the charging lane 200B has to be used. Thus, the processor 106 may, in step S126, determine that the charging lane 200B is to be used.

Thereafter, the processor 106 may, in step S127, determine whether it is possible to attain the charging target by using the charging lane 200B. In other words, the processor 106 may determine whether it is possible to attain the target by using the two charging lanes 200A and 200B.

Upon determining that the target is attainable (Yes in step S127), the processor 106 may bring the series of processes to an end.

Upon determining that the target is unattainable (No in step S127), the processor 106 may, in step S128, determine that the charging lane 200C is to be used.

Thus, the processor 106 may determine the use of all of the charging lanes 200A, 200B, and 200C.

Described above is the process performed in a case where it is determined in step S109 of FIG. 7 that it is possible to travel to the starting point A1 of the charging lane 200A, i.e., a case where it is not possible to travel to the starting point B1 of the charging lane 200B but it is possible to travel to the starting point A1 of the charging lane 200A.

Described next with reference to FIG. 8 is a process performed in a case where it is determined in step S106 of FIG. 7 that the charging target is unattainable by using any of the charging lanes 200 singly.

Conditions for execution of the series of processes illustrated in FIG. 8 are summarized as follows: a case where it is possible to travel to at least the starting point B1 of the charging lane 200B with the current power storage amount of the onboard battery 103, and where two or more of the charging lanes 200 have to be used to attain the charging target.

The processor 106 may, in step S111 of FIG. 8, determine whether it is possible to attain the charging target by using the two charging lanes 200B and 200C.

In using two charging lanes 200, it is supposed that the charging lanes 200A and 200B may be used, the charging lanes 200A and 200C may be used, and the charging lanes 200B and 200C may be used. However, the use of the charging lanes 200B and 200C may be considered first in step S111, because the power storage amount is likely to be largest at the second location in this case.

For example, in a case where the vehicle 100 actually travels on the assumption that the charging target is attainable by using the charging lanes 200A and 200B, a power storage amount more than expected can be consumed from an endpoint B2 of the charging lane 200B to the second location. However, using the charging lane 200C shortens a section where unexpected consumption of the power storage amount can occur, e.g., a section from the endpoint C2 to the second location. This makes it easier to leave the expected power storage amount.

Moreover, in a case where the charging target is the "target power storage level", it is evident that a remaining power storage amount at the second location becomes larger by making a timing of attaining the target power storage level as late as possible.

Therefore, in step S111, the processor 106 may determine whether it is possible to attain the charging target by using the charging lanes 200B and 200C.

Upon determining that the charging target is attainable by using the charging lanes 200B and 200C in step S111 (Yes in step S111), the processor 106 may, in step S112, determine that the charging lanes 200B and 200C are to be used and bring the series of processes to an end.

Thus, the processor 106 may determine the non-use of the charging lane 200A and the use of the charging lane 200B and the charging lane 200C.

Upon determining that the charging target is unattainable by using the charging lanes 200B and 200C in step S111 (No in step S111), the processor 106 may, in step S113, determine whether it is possible to attain the charging target by using the charging lanes 200A and 200C.

Upon determining that the charging target is attainable by using the charging lanes 200A and 200C in step S113 (Yes in step S113), the processor 106 may, in step S114, determine that the charging lanes 200A and 200C are to be used and bring the series of processes to an end.

Thus, the processor 106 may determine the use of the charging lane 200A, the non-use of the charging lane 200B, and the use of the charging lane 200C.

Upon determining that the charging target is unattainable by using the charging lanes 200A and 200C in step S113 (No in step S113), the processor 106 may, in step S115, determine whether it is possible to attain the charging target by using the charging lanes 200A and 200B.

Upon determining that the charging target is attainable (Yes in step S115), the processor 106 may, in step S116, determine that the charging lanes 200A and 200B are to be used and bring the series of processes to an end.

Thus, the processor 106 may determine the use of the charging lane 200A and the charging lane 200B and the non-use of the charging lane 200C.

Upon determining that the charging target is unattainable by using the charging lanes 200A and 200B in step S115 (No in step S115), the processor 106 may, in step S117, determine that all of the charging lanes 200A, 200B, and 200C are to be used, and bring the series of processes to an end.

As described above, the processor 106 may perform various processes to minimize the number of the charging lanes 200 to be used out of the plurality of charging lanes 200. In other words, the processor 106 may perform control to make the number of the charging lanes 200 not to be used as large as possible.

This makes it possible to suppress congestion on the charging lane 200.

The processor 106 may perform control to reduce the number of the charging lanes 200 to be used and, moreover, to use the charging lane 200 as close as possible to the second location.

This makes it possible to put off the use of the charging lane 200, suppressing unnecessary use of the charging lane 200. It is also possible to increase the remaining power storage amount at the second location, which helps to improve the user's convenience.

In the examples of the flowcharts described above, if it is determined that the charging target is unattainable by using the charging lane 200C singly, a similar determination process may be performed for the charging lane 200B and thereafter for the charging lane 200A.

However, for example, in a case where the power storage amount to be increased by the use of the charging lane 200B is smaller than the power storage amount to be increased by the use of the charging lane 200C, it is evident that the charging target is unattainable by using the charging lane 200B singly.

Hence, if it is determined that the charging target is unattainable by using the charging lane 200C singly, a determination process like step S104 and step S106 may be performed for only the charging lane 200 that is able to increase the power storage amount more greatly than the charging lane 200C.

This makes it possible to reduce processes to be executed by the processor 106, which helps to lessen processing load.

Before the series of processes illustrated in FIG. 7, FIG. 8, and FIG. 9, the predetermined number of (e.g., five) routes may be presented as the search result to the user on the basis of the arrival time or the travel distance. In that case, the processes illustrated in FIG. 7, FIG. 8, and FIG. 9 may be executed for the route designated by the user.

Narrowing down the routes in advance makes it unnecessary to determine the necessity to use the charging lane 200 for, for example, a uselessly roundabout route that is unlikely to be selected practically for the use of the charging lane 200. This makes it possible to lessen the processing load on the processor 106.

The charging lane 200 is not necessarily available. The charging lanes 200 can partly be unavailable due to, for example, an accident or construction work.

For such a case, the vehicle 100 may include a communication processor, and may be configured to issue an information acquisition request to a server that manages accident information and construction work information, for example.

For example, a process of acquiring latest accident information and construction work information may be executed before executing the series of processes illustrated in FIG. 7, FIG. 8, and FIG. 9, and the charging lane 200 not to be used may be set in advance on the basis of the acquired information.

This makes it possible to prevent failure to arrive at the second location due to failure to increase the power storage amount of the onboard battery 103 as expected.

Moreover, the server may manage the charging lane 200 not unavailable but recommended not to be used. For example, the server may manage information on the charging lane 200 where traffic congestion is predicted on the basis of traveling data of other vehicles. In one example, in a case where traffic congestion on the charging lane 200 is worse than on a normal lane (non-charging lane) in the same section, the charging lane 200 may be managed as the charging lane 200 recommended not to be used. This makes it possible to prevent the arrival at the second location from being delayed by using the charging lane 200, and to improve the user's convenience.

The accident information, the construction work information, and the traffic congestion information may be, for example, updated as appropriate. For example, the processor 106 may request the server to acquire various types of information when the vehicle 100 arrives at the starting point A1 of the charging lane 200A illustrated in FIG. 10. In a case where a situation has changed from when the vehicle 100 was located at the first location, the processor 106 may execute the series of processes illustrated in FIG. 7, FIG. 8, and FIG. 9 again to enable optimum use of the charging lane 200.

As described above, various processes may be executed each time the vehicle 100 reaches the starting point or the endpoint of the charging lane 200. Notification may be issued to the vehicle 100 at a timing of the server detecting occurrence of an accident or traffic congestion, and the processor 106 of the vehicle 100 may execute the series of processes illustrated in FIG. 7, FIG. 8, and FIG. 9 at a timing of receiving the notification.

This makes it possible to flexibly address a sudden situation change, which helps to improve convenience.

In a case where the vehicle 100 is a hybrid electric vehicle that is able to travel by using both fuel and the onboard battery 103, various processes may be performed in consideration of traveling by consuming fuel as appropriate.

For example, the processor 106 may perform the process of determining whether it is possible to travel to the charging lane 200C with the current power storage amount in step S101 of FIG. 7. Upon determining that it is not possible to travel to the charging lane 200C, the processor 106 may further determine whether it is possible to travel to the charging lane 200C by performing fuel-consuming travel in combination. Upon determining that it is possible to travel to the charging lane 200C by performing traveling using fuel and traveling using the onboard battery 103 in combination, the processor 106 may execute a process such as making the user select whether to allow traveling using fuel to be performed in combination. In such a case, the determination processes, for example, described above may be performed by using fuel consumption information as well as the electricity consumption information.

Performing such a process makes it possible to minimize the use of the charging lane 200.

In a case where the charging lane 200 is more congested than a non-charging lane, it may be determined that traveling using fuel is to be performed in combination.

This makes it possible to prevent too much time from being taken for movement by traveling on the congested charging lane 200. It also is possible to prevent congestion on the charging lane 200 from being worsened.

In a case where the charging lane 200 is laid on a road with one lane on each side, the vehicle 100 may have to travel on the charging lane 200 even in a case of not using the charging lane 200. In that case, a configuration may be adopted that enables selection of not performing charging of the onboard battery 103 even though the vehicle 100 travels on the charging lane 200.

This makes it possible to prevent a usage fee from being collected against the user's intention in a situation where the vehicle 100 has to travel on the charging lane 200.

The processes and examples described above may be combined with each other in any feasible way. The processes described above may partly be omitted, or a common process may be added.

As described above, the driving assistance apparatus 1 included in the vehicle 100 includes the information acquiring unit 10 and the determining unit 12. The information acquiring unit 10 acquires the target value of the power storage amount of the onboard battery 103. The determining unit 12 determines the charging lane 200 to be used in implementing charging of the onboard battery 103, out of the plurality of charging lanes 200 provided, i.e., laid, on the travel route of the vehicle 100 to the expected arrival location, apart from each other along a direction of the travel route, and configured to charge the onboard battery 103 while the vehicle 100 is traveling.

The determining unit 12 determines the charging implementation lane to minimize the number of times of charging of the onboard battery 103, on the basis of the target value of the power storage amount.

The target value of the power storage amount may refer to, for example, a charge amount for the onboard battery 103, i.e., the expected increase in power storage amount, or the desired power storage level, i.e., the target power storage level. These values may be inputted by the user, such as the driver or a passenger.

The charging lane 200 to be used is determined out of the charging lanes 200 provided on the route, on the basis of such information related to the onboard battery 103, to reduce the number of the charging lanes 200 to be used. This makes it possible to satisfy the user's request and to prevent the vehicle 100 from unnecessarily traveling on the charging lane 200. Consequently, it is possible to promote efficient use of the charging lane 200. It is also possible to reduce unnecessary lane changes between the charging lane 200 and a non-charging lane, which helps to improve traveling stability of the vehicle.

The driving assistance apparatus 1 may include the charging implementation distance calculator 11 that calculates, on the basis of the target value of the power storage amount, the charging implementation distance of the vehicle 100 on the charging implementation lane, i.e., the charging lane 200 to be used.

This enables calculation of the travel distance on the charging lane 200 for attainment of the target related to the power storage amount.

This makes it possible to appropriately determine which charging lane 200 is to be used out of the plurality of charging lanes 200.

The determining unit 12 of the driving assistance apparatus 1 may determine, in a case where the total length of the charging implementation lane is longer than the charging implementation distance, the travel starting location, the travel ending location, or both on the charging implementation lane.

This enables determination to be made to use a part of the charging lane 200 in a case where the charging implementation distance is shorter than the length of the charging lane 200.

This makes it possible to prevent the charging lane 200 from being congested.

The determining unit 12 of the driving assistance apparatus 1 may, in a case where two or more charging implementation patterns include the same number of charging implementation lanes, determine the charging implementation lane on the basis of, out of the plurality of charging implementation patterns, the charging implementation pattern in which the end of the charging implementation lane is closest to the expected arrival location.

Figure 10:
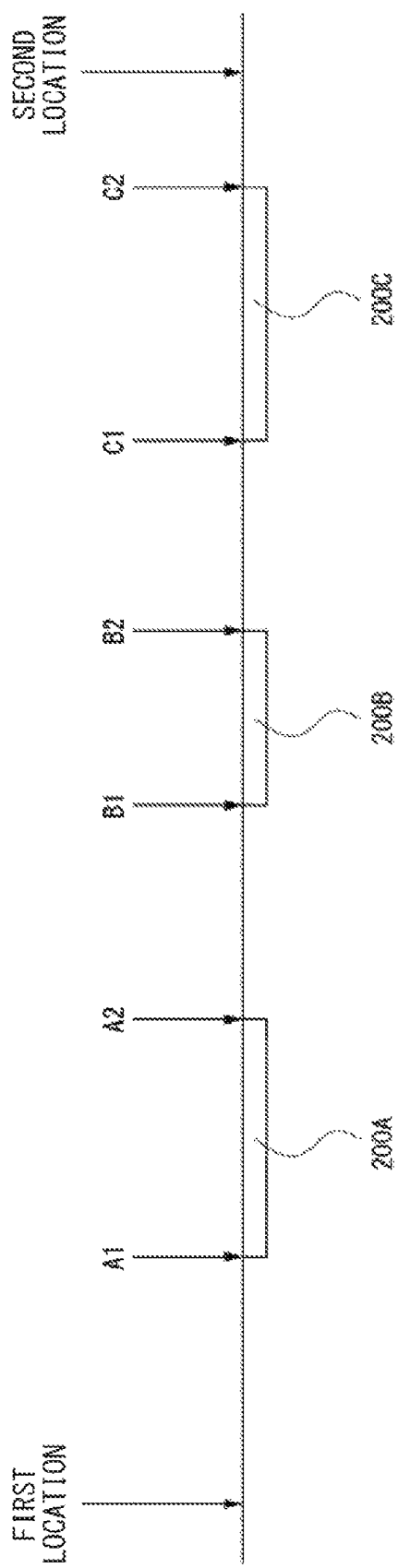
FIG. 10 is a diagram illustrating an example in which three charging lanes are laid between the first location and the second location.

The end of the charging implementation lane may be, for example, the endpoint B2 of the charging lane 200B in a case where the charging lanes 200A and 200B serve as the charging implementation lane in the state illustrated in FIG. 10.

Thus, it may be determined that the charging lane 200 closest to the expected arrival location, i.e., the second location, is to be used in a case where, for example, it is possible to attain the target by using any of the plurality of charging lanes 200.

This makes it possible to make the power storage amount when the expected arrival location is reached as large as possible.

In one example, assuming that 80% is designated as the target power storage level, the remaining power storage amount at the expected arrival location in a case where the power storage amount 80% is attained at a point in time of passing through the charging lane 200C farthest from the departure location, i.e., the first location, may be larger than the remaining power storage amount at the expected arrival location in a case where the power storage amount 80% is attained at a point in time of passing through the charging lane 200A closest to the departure location and thereafter the charging lane 200 is not used.

In the driving assistance apparatus 1, the target value of the power storage amount may be information on the expected increase in power storage amount, i.e., the power storage amount expected to be increased in the onboard battery 103 by using the charging lane 200.

The information on the expected increase in power storage amount may be, for example, designated by the user.

The determining unit 12 may determine efficient use of the charging lane 200 for attainment of the designated expected increase in power storage amount. This makes it possible to prevent, for example, unnecessary use of the charging lane 200.

In the driving assistance apparatus 1, the target value of the power storage amount may be information on the target power storage level.

The target power storage level may be, for example, set by the user intending to perform charging of the onboard battery 103 to attain a predetermined power storage level. A timing of attaining the predetermined power storage level may be a timing of passing through the charging lane 200 closest to the expected arrival location, i.e., the second location, or may be a timing while the vehicle 100 is traveling on any of the charging lanes 200.

The determining unit 12 may determine efficient use of the charging lane 200 for attainment of the target power storage level. This makes it possible to prevent, for example, unnecessary use of the charging lane 200.

The determining unit 12 of the driving assistance apparatus 1 may, in a case where the power storage amount of the onboard battery 103 becomes the predetermined value or more while the vehicle 100 is traveling on the charging lane 200, determine that further use of the charging lane 200 on which the vehicle 100 is traveling is unnecessary.

This makes it possible to prevent the vehicle 100 from traveling on the charging lane 200 even though the target value of the power storage amount (charging target) has been attained.

This promotes the efficient use of the charging lane 200, making it possible to prevent the charging lane 200 from being congested.

Figure 2:
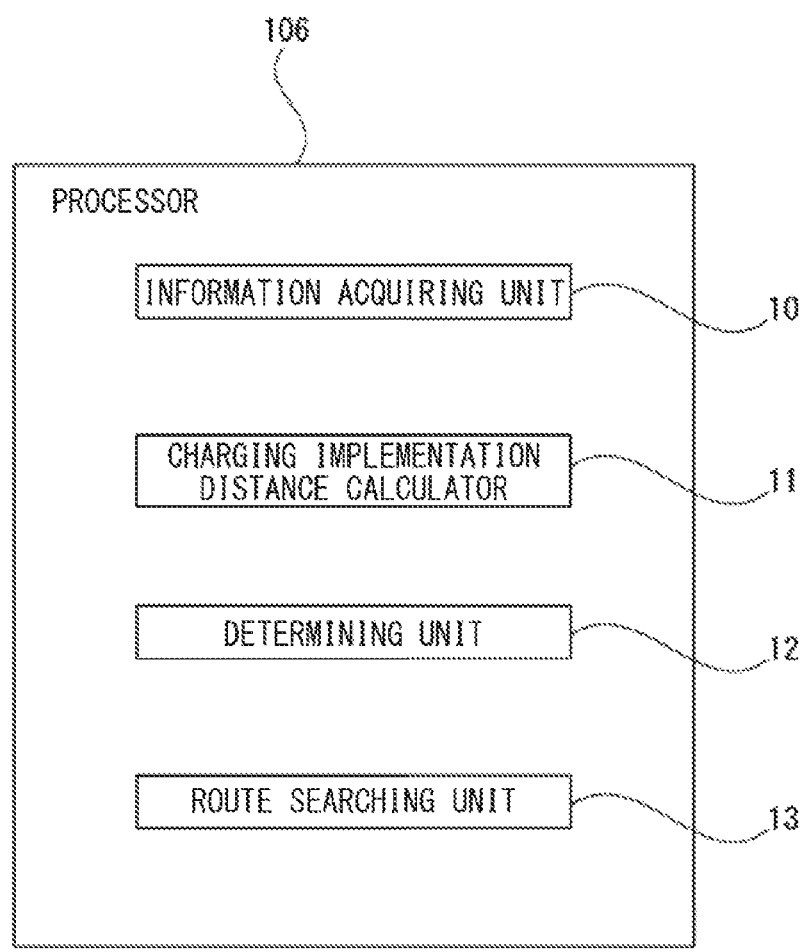
FIG. 2 is a diagram illustrating an example configuration of a processor.

Each of the information acquiring unit 10, the charging implementation distance calculator 11, the determining unit 12, and the route searching unit 13 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the information acquiring unit 10, the charging implementation distance calculator 11, the determining unit 12, and the route searching unit 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the information acquiring unit 10, the charging implementation distance calculator 11, the determining unit 12, and the route searching unit 13 illustrated in FIG. 2.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A driving assistance apparatus comprising:
one or more processors; and
one or more memories storing instructions for causing the one or more processors to:
    acquire a target value of a power storage amount and a current power storage amount in an onboard battery mounted on a vehicle;
    acquire, for each of a plurality of charging lanes of a travel route from a first location to a second location, a length of each charging lane;
    determine, based on the acquired target value of the power storage amount, the current power storage amount, and the length of each charging lane, one or more charging implementation lanes for charging the onboard battery from the plurality of charging lanes, wherein the plurality of charging lanes are (i) traveling lanes provided on the travel route of the vehicle to the second location, (ii) apart from each other along a direction of the travel route, and (iii) capable of charging the onboard battery while the vehicle is traveling, the one or more charging implementation lanes being determined to minimize a number of charging lanes to be used for charging the onboard battery to obtain the target value of the power storage amount in the onboard battery;
    calculate, based on the target value of the power storage amount, a charging implementation distance of the vehicle on the determined one or more charging implementation lanes;
    in response to the determined one or more charging implementation lanes have a total length that is longer than the charging implementation distance, determine a travel starting location, a travel ending location, or both, of the vehicle within the determined one or more charging implementation lanes;
    cause the onboard battery to be charged by the determined one or more charging implementation lanes while the vehicle is traveling on the determined one or more charging implementation lanes;
    determine whether the vehicle has traveled the calculated charging implementation distance on the determined one or more charging implementation lanes; and
    in response to determining that the vehicle has traveled the calculated charging implementation distance, make a lane change to switch the vehicle from one of the determined one or more charging implementation lanes on which the vehicle is traveling to a non-charging lane, to avoid the unnecessary charging of the onboard battery with the lane change.

2. The driving assistance apparatus according to claim 1, wherein, in a case where charging implementation patterns include: a first charging implementation pattern including one or more first charging implementation lanes; and a second charging implementation pattern including one or more second charging implementation lanes of which an end is closer to the second location than an end of the one or more first charging implementation lanes of the first pattern, and a lane number of the one or more first charging implementation lanes included in the first pattern is same as a lane number of the one or more second charging implementation lanes included in the second pattern, the one or more processors are caused to determine the one or more charging implementation lanes on a basis of the second charging implementation pattern out of the first charging implementation pattern and the second charging implementation pattern.

3. The driving assistance apparatus according to claim 1, wherein the second location is an expected arrival location, and the plurality of charging lanes are provided on a same travel route of the vehicle to the expected arrival location.

4. The driving assistance apparatus according to claim 1, wherein the travel route of the vehicle to the second location is selected before the determination of the one or more charging implementation lanes.

5. The driving assistance apparatus according to claim 1, wherein the one or more charging implementation lanes are determined at or after the vehicle begins to travel on one of the plurality of charging lanes.

6. The driving assistance apparatus according to claim 1, wherein the second location is a destination of the vehicle.

7. A driving assistance apparatus comprising
circuitry configured to
acquire a target value of a power storage amount and a current power storage amount in an onboard battery mounted on a vehicle;
acquire, for each of a plurality of charging lanes of a travel route from a first location to a second location, a length of each charging lane;
determine, based on the acquired target value of the power storage amount, the current power storage amount, and the length of each charging lane, one or more charging implementation lanes for charging the onboard battery from the plurality of charging lanes, wherein the plurality of charging lanes are (i) traveling lanes provided on the travel route of the vehicle to the second location, (ii) apart from each other along a direction of the travel route, and (iii) capable of charging the onboard battery while the vehicle is traveling, the one or more charging implementation lanes being determined to minimize a number of charging lanes to be used for charging the onboard battery to obtain the target value of the power storage amount in the onboard battery;
calculate, based on the target value of the power storage amount, a charging implementation distance of the vehicle on the determined one or more charging implementation lanes;
in response to the determined one or more charging implementation lanes have a total length that is longer than the charging implementation distance, determine a travel starting location, a travel ending location, or both, of the vehicle within the determined one or more charging implementation lanes;
cause the onboard battery to be charged by the determined one or more charging implementation lanes while the vehicle is traveling on the determined one or more charging implementation lanes;
determine whether the vehicle has traveled the calculated charging implementation distance on the determined one or more charging implementation lanes; and
in response to determining that the vehicle has traveled the calculated charging implementation distance, make a lane change to switch the vehicle from one of the determined one or more charging implementation lanes on which the vehicle is traveling to a non-charging lane, to avoid the unnecessary charging of the onboard battery with the lane change.

8. The driving assistance apparatus according to claim 7, wherein the second location is an expected arrival location, and the plurality of charging lanes are provided on a same travel route of the vehicle to the expected arrival location.

9. The driving assistance apparatus according to claim 7, wherein the travel route of the vehicle to the second location is selected before the determination of the one or more charging implementation lanes.

10. The driving assistance apparatus according to claim 7, wherein the one or more charging implementation lanes are determined at or after the vehicle begins to travel on one of the plurality of charging lanes.

11. The driving assistance apparatus according to claim 7, wherein the second location is a destination of the vehicle.

* * * * *